US010293678B1

(12) United States Patent
Vandiver et al.

(10) Patent No.: US 10,293,678 B1
(45) Date of Patent: May 21, 2019

(54) BREAKABLE PIN AND HOLDING STRUCTURE FOR IN-VEHICLE COMPONENT

(71) Applicant: DENSO International America, Inc., Southfield, MI (US)

(72) Inventors: Aaron Vandiver, Ferndale, MI (US); Adam Jones, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/813,255

(22) Filed: Nov. 15, 2017

(51) Int. Cl.

| | |
|---|---|
| ***B60K 11/02*** | (2006.01) |
| ***B62D 21/15*** | (2006.01) |
| ***B60K 11/04*** | (2006.01) |
| ***F28F 9/00*** | (2006.01) |
| ***F16B 5/02*** | (2006.01) |
| ***B60H 1/00*** | (2006.01) |
| *B60R 21/34* | (2011.01) |

(52) U.S. Cl.
CPC .......... *B60K 11/04* (2013.01); *B60H 1/00535* (2013.01); *F16B 5/0241* (2013.01); *F28F 9/002* (2013.01); *B60R 2021/343* (2013.01); *F28F 2275/143* (2013.01)

(58) Field of Classification Search
CPC ...... B60K 11/04; B62D 25/084; B62D 21/15; F28F 9/002; F28F 2275/143
See application file for complete search history.

(56) References Cited

U.S. PATENT DOCUMENTS

| | | | | |
|---|---|---|---|---|
| 7,861,988 B2 | 1/2011 | Hamida et al. | | |
| 2012/0247849 A1* | 10/2012 | Ogawa .................. | B60K 11/04 180/68.4 |
| 2015/0069682 A1* | 3/2015 | Cotter ....................... | F16F 9/02 267/119 |

* cited by examiner

*Primary Examiner* — Bryan A Evans

(57) ABSTRACT

The present disclosure provides a breakable pin for an in-vehicle component disposed on a vehicle body. The breakable pin includes a first portion, a second portion, and a breakable portion. The first portion is inserted into the in-vehicle component along a first direction and detachably connected to the in-vehicle component. The second portion is fixed to the vehicle body. The breakable portion is positioned between the first portion and the second portion. The breakable portion has a cross-section taken along a second direction perpendicular to the first direction. The cross-section of the breakable portion has an outer shape shape of rotational symmetry except a circular shape.

22 Claims, 6 Drawing Sheets

BREAKABLE PIN AND HOLDING STRUCTURE FOR IN-VEHICLE COMPONENT

TECHNICAL FIELD

The present disclosure relates to a breakable pin and a holding structure for an in-vehicle component with respect to a vehicle body through the breakable pin.

BACKGROUND

Conventionally, there have been structures for holding an in-vehicle component, such as a cooling module, in an engine compartment. Such a holding structure typically holds an in-vehicle component with respect to a vehicle body using fastening means such as screws or bolts and nuts. However, these conventional methods may cause damages to the in-vehicle component at the fixing points when a vehicle receives an impact due to, e.g., a traffic collision.

SUMMARY

A first aspect of the present disclosure provides a breakable pin for an in-vehicle component disposed on a vehicle body. The breakable pin includes a first portion, a second portion, and a breakable portion. The first portion is inserted into the in-vehicle component along a first direction and detachably connected to the in-vehicle component. The second portion is fixed to the vehicle body. The breakable portion is positioned between the first portion and the second portion. The breakable portion has a cross-section taken along a second direction perpendicular to the first direction. The cross-section of the breakable portion has an outer shape of rotational symmetry except a circular shape.

A second aspect of the present disclosure provides a breakable pin for an in-vehicle component disposed on a vehicle body. The breakable pin includes a first portion, a second portion, and a breakable portion. The first portion is inserted into the in-vehicle component along a first direction and detachably connected to the in-vehicle component. The second portion is fixed to the vehicle body. The breakable portion is positioned between the first portion and the second portion. The breakable portion defines a hollow space therein and has a cross-section taken along a second direction perpendicular to the first direction. The cross-section of the hollow space has a shape of rotational symmetry except a circular shape.

A third aspect of the present disclosure provides a holding structure for an in-vehicle component on a vehicle body. The holding structure includes a first connecting portion, a second connecting portion, and a breakable pin. The first connecting portion is formed in the in-vehicle component and defines a first hole therein. The second connecting portion is formed in the vehicle body and defines a second hole therein. The breakable pin includes a first portion, a second portion, and a breakable portion. The first portion is inserted into the first hole along a first direction to be detachably connected to the first connecting portion. The second portion is inserted into the second hole along the first direction to be fixed to the second connecting portion. The breakable portion is between the first portion and the second portion and has a cross-section taken along a second direction perpendicular to the first direction. The cross-section of the breakable portion has an outer shape of rotational symmetry except a circular shape.

A fourth aspect of the present disclosure provides a holding structure for an in-vehicle component on a vehicle body. The holding structure includes a first connecting portion, a second connecting portion, and a breakable pin. The first connecting portion is formed in the in-vehicle component and defines a first hole therein. The second connecting portion is formed in the vehicle body and defines a second hole therein. The breakable pin includes a first portion, a second portion, and a breakable portion. The first portion is inserted into the first hole along a first direction to be detachably connected to the first connecting portion. The second portion is inserted into the second hole along the first direction to be fixed to the second connecting portion. The breakable portion is between the first portion and the second portion and defines a hollow space therein and has a cross-section taken along a second direction perpendicular to the first direction. The cross-section of the hollow space has a shape of rotational symmetry except a circular shape.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
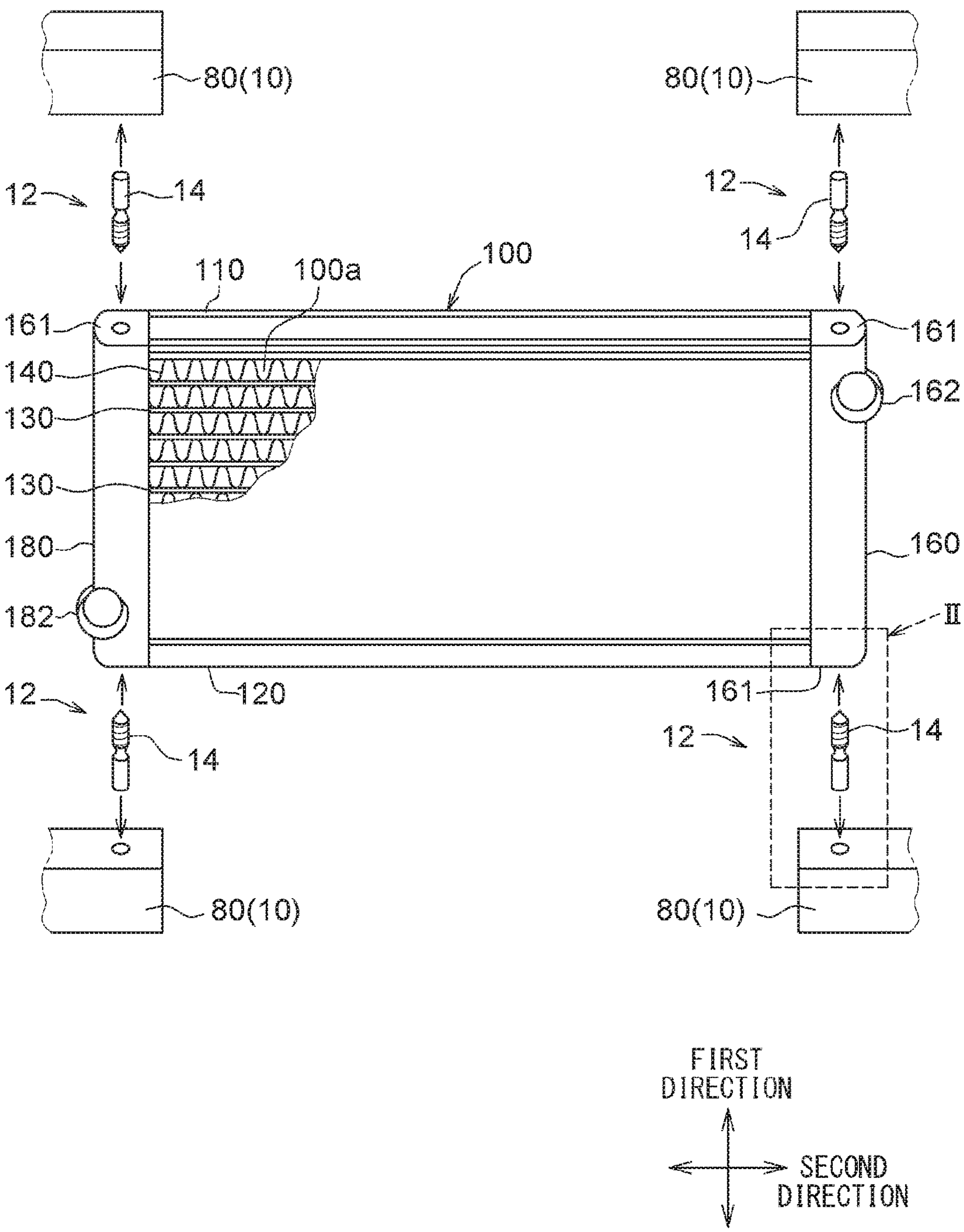
FIG. 1 is a perspective view of a radiator according to a first embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As follows, a first embodiment of the present disclosure will be described with reference to FIGS. 1 to 3. In the following descriptions and the drawings, a "first direction" extends along a vertical direction in gravity, whereas a "second direction" is generally perpendicular to the first direction and generally parallel to a horizontal direction.

In the present embodiment, a radiator 100 as an in-vehicle component is attached to a frame 10 (a vehicle body) of a vehicle through four holding structures 12 (more specifically, through four breakable pins 14) at four corners of the radiator 100. The frame 10 defines an engine compartment in which an internal combustion engine (not shown) is installed. The engine compartment is positioned on a front side of the vehicle, and the radiator 100 is disposed in the front-end part of the engine compartment. As shown in FIG. 1, in this example, the frame 10 includes four holding bases 80 by which the four corners of the radiator 100 are held.

The radiator 100 includes a pair of tanks (tank bodies) 160 and 180, a plurality of tubes 130, a plurality of fins 140, and two side plates 110 and 120 disposed on both side ends of the radiator 100 opposite to each other along the first direction. The fins 140 and the tubes 130 may be alternately arranged along the first direction and form a core 100*a* of the radiator 100.

The radiator 100 includes an inlet 162 and an outlet 182, and both the inlet 162 and the outlet 182 may be connected with an internal combustion engine through unillustrated pipes. Cooling water (thermal medium) is circulated between the radiator 100 and the internal combustion engine while exchanging heat with air flowing through the core 100*a*. As shown in FIG. 1, the core 100*a* is interposed between the tanks 160 and 180 along the second direction.

Each of the tanks 160 and 180 is formed of, e.g., plastic. As shown in FIG. 1, each of the tanks 160 and 180 has end portions 161 at both opposite sides in the first direction, and the breakable pin 14 is detachably disposed in the respective end portion 161, as will be described later. Each of the end portions 161 of the tank 160, 180 serves as a first connecting portion for the breakable pin 14 in the present disclosure.

Figure 2:
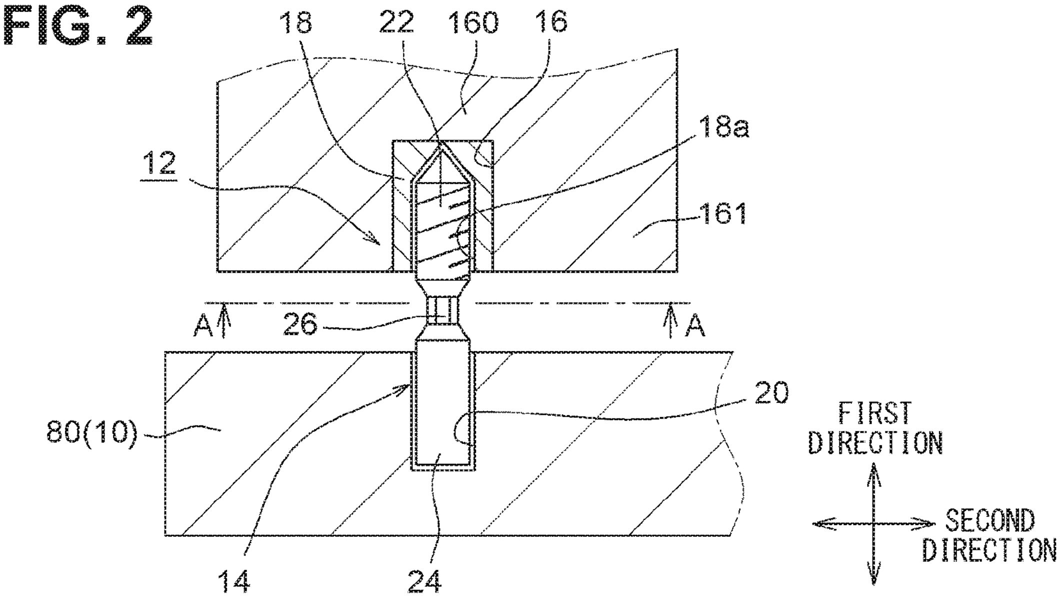
FIG. 2 is a cross-sectional view showing a holding structure applied to one corner of the radiator as indicated by the broken line II of FIG. 1.

FIG. 2 shows a partially expanded cross-sectional view of the holding structure 12 of the present embodiment as indicated by the broken line II in FIG. 1 (positioned at the lower right corner of the radiator 100 in FIG. 1). It should be noted that the following description concerning the holding structure 12 can be applied to the other three holding structures 12.

The end portion 161 of the tank 160 defines a hole 16 recessed from a lower surface of the tank 160. A metal insert 18 is disposed in the hole 16 by insert molding. The metal insert 18 defines a female threaded portion (a first hole) 18*a* therein that is open downward through an opening. The breakable pin 14 is inserted into the female threaded portion 18*a* through the opening.

Each of the holding bases 80 is formed of metal, for example. The holding base 80 serves as a second connecting portion for the breakable pin 14. The holding base 80 defines a fixing hole (a second hole) 20 as a second hole into which the breakable pin 14 is inserted.

As shown in FIG. 2, the breakable pin 14 generally includes a first portion 22, a second portion 24, and a breakable portion 26. The breakable pin 14 is entirely formed of plastic in the present embodiment. The first portion 22 has a columnar shape and includes a tapered end. The first portion 22 has substantially the same diameter as the female threaded portion 18*a*. The first portion 22 has a threaded outer surface that is engageable with the female threaded portion 18*a*. Thus, the first portion 22 (the breakable pin 14) is detachably attached to the end portion 161 (the tank 160) by being screwed into the female threaded portion 18*a*.

The second portion 24 has a columnar shape and is coaxially aligned with the first portion 22. In this embodiment, the second portion 24 has substantially the same diameter as the first portion 22. The second portion 24 is inserted into the fixing hole 20 of the holding base 80. The second portion 24 is fixedly attached to the holding base 80 through fixing means such as glue.

The breakable portion 26 is positioned between the first portion 22 and the second portion 24 and connects the first and second portions 22, 24 to each other. The breakable portion 26 is coaxial with the first and second portions 22, 24. As shown in FIG. 2, the breakable portion 26 is narrower than the first and second portions 22, 24, thereby being easily breakable as compared to the first and second portion 22, 24 when an impact is applied to the radiator 100 or the holding base 80.

Figure 3:
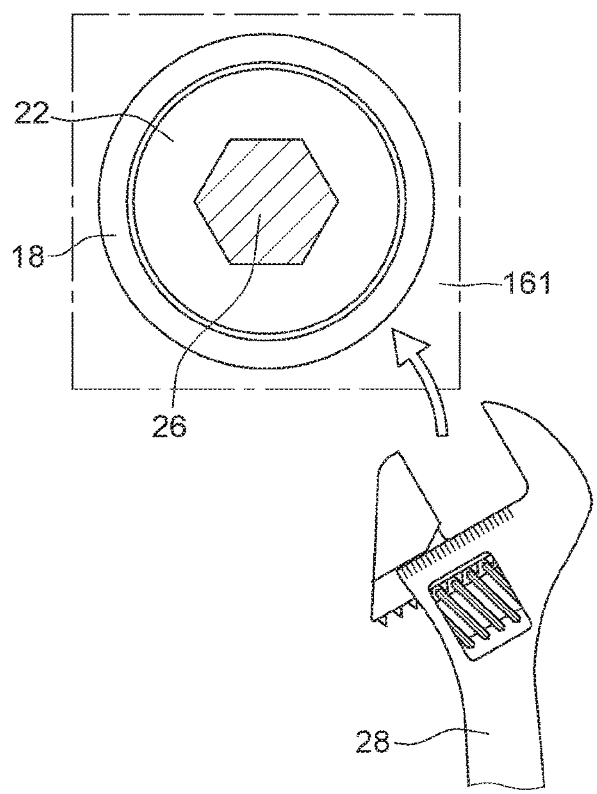
FIG. 3 is a cross-sectional view of a breakable pin taken along A-A line in FIG. 2.

FIG. 3 shows a cross-section of the breakable portion 26 taken along the line A-A which is perpendicular to the first direction (i.e., parallel to the second direction). As shown, the cross-section of the breakable portion 26 has an outer shape of rotational symmetry except a circular shape. In the present embodiment, the cross-section of the breakable portion 26 has an outer shape of a regular polygon, more specifically, a regular hexagonal shape. It should be noted that the shape of the cross-section of the breakable portion 26 may be another type of a regular polygonal shape, such as an equilateral triangle, a square, a regular pentagon, a regular heptagon, a regular octagon, or the like.

Therefore, if the breakable pin 14 is broken and the first and second portions 22, 24 are separated from each other, the regular hexagonal cross-section appears (i.e., exposed to outside). This regular hexagonal shape of the breakable portion 26 as appeared allows a fastening tool 28, such as a wrench, a hex socket, or a nut driver, to grip the breakable portion 26 (see FIG. 3). Therefore, the first portion 22, which is attached to the tank 160, can be easily released from the end portion 161 of the tank 160 using the fastening tool 28.

The breakable portion 26 is formed to be narrower than the other portions 22, 24 of the breakable pin 14, as described above. Thus, even if an impact is applied to the radiator 100 or the frame 10, only the breakable pin 14 is broken at the breakable portion 26 without causing substantial damage to the radiator 100 and/or the frame 10. Thus, the radiator 100 and the frame 10 can be still used by merely replacing the broken pin 14 with new one.

Second Embodiment

Figure 4:
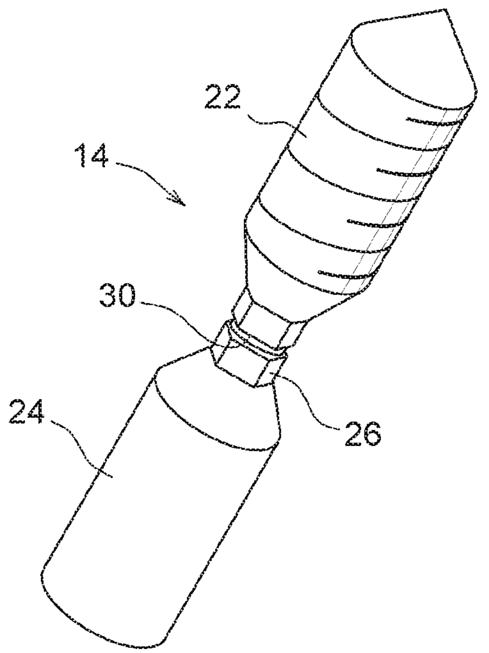
FIG. 4 is a perspective view of the breakable pin according to a second embodiment.

Next, a second embodiment of the present disclosure will be described with reference to FIG. 4. In this embodiment, the breakable portion 26 further includes a groove 30 on the breakable portion 26. The groove 30 is formed circumferentially along an outer surface of the breakable portion 26. By providing the groove 30 along the breakable portion 26, the breakable portion 26 can be more easily breakable along the groove 30 leaving the fracture surface with a clear regular hexagonal shape.

Third Embodiment

Figure 5:
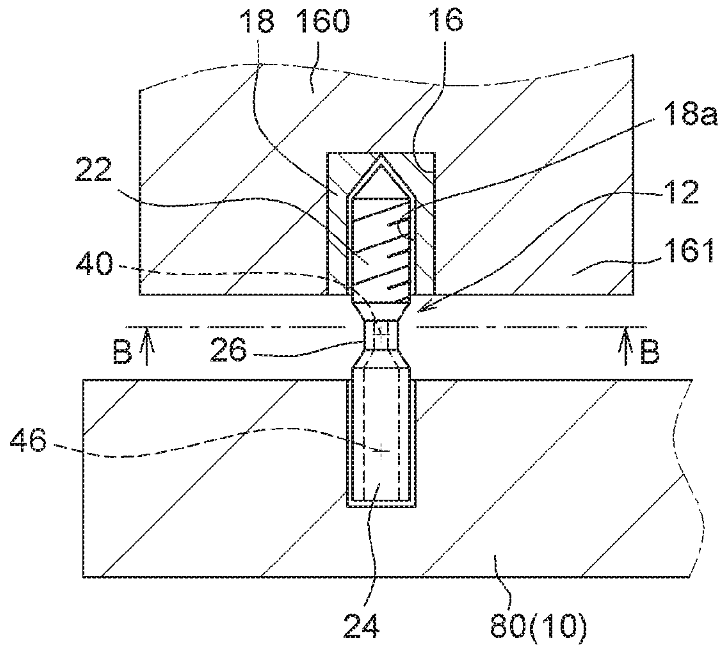
FIG. 5 is a cross-sectional view of the holding structure according to a third embodiment.
Figure 6:
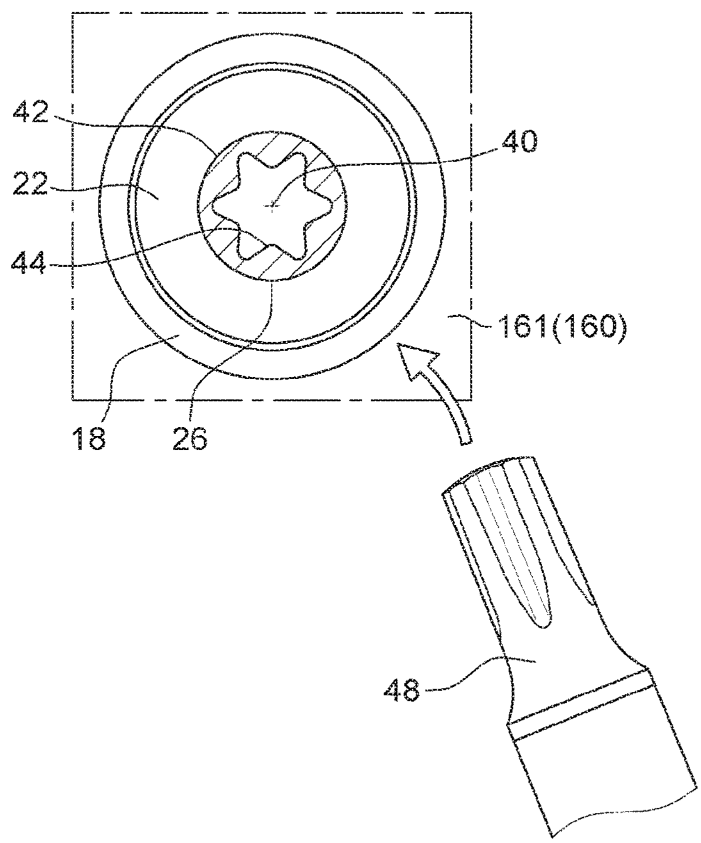
FIG. 6 is a cross-sectional view of the breakable pin taken along B-B line in FIG. 5.

Next, a third embodiment of the present disclosure will be described with reference to FIGS. 5 to 6. In this embodiment, the breakable portion 26 has a cylindrical shape with a hollow space 40. As shown in FIG. 6, the breakable portion 26 has a cross-section defined by an outer wall 42 having a circular shape and an inner wall 44 defining the hollow space 40. The inner wall 44 of the breakable portion 26 provides the hollow space 40 with a shape of rotational symmetry except a circular shape. In the present embodiment, the cross-section of the breakable portion 26 (the hollow space 40) has a shape of an N-point star-shaped pattern, more specifically, a 6-point star-shaped pattern (i.e., Torx®). It should be noted that the cross-sectional shape of the hollow space 40 may be another type of an N-point star-shaped pattern, such as 3-point, 4-point, 5-point, 8-point, or 12-point start-shaped pattern.

In this embodiment, the second portion 24 of the breakable pin 14 is also formed in a cylindrical shape with an inner space 46. The inner space 46 of the second portion 24 is in communication with the hollow space 40 of the breakable portion 26. Thus, a fastening tool 48, such as a hex key or a socket bit, can access to and be fit into the hollow space 40 of the breakable portion 26 through the inner space 46 of the second portion 24 when fastening the breakable pin 12 into the female threaded portion 18*a*. In the present embodiment, there is no inner space formed in the first portion 22 in this embodiment.

As described above, the breakable pin 14 in the present embodiment has the breakable portion 26 with the 6-point star-shaped pattern. Thus, if the breakable pin 14 is broken at the breakable portion 26 and the second portion 24 is separated from the first portion 22, the hollow space 40 with the 6-point star-shaped pattern is exposed to outside. Accordingly, a fastening tool 48, such as a hex key or a socket bit, can be fit into the hollow space 40, and therefore, the first portion 22 can be easily removed from the tank 160 (the end portion 161) using the fastening tool 48.

It should be understood that the groove 30 described in the second embodiment can be used in the breakable pin 14 of the third embodiment. That is, the groove 30 may be formed circumferentially along the outer wall of the breakable portion 26.

Fourth Embodiment

Figure 7:
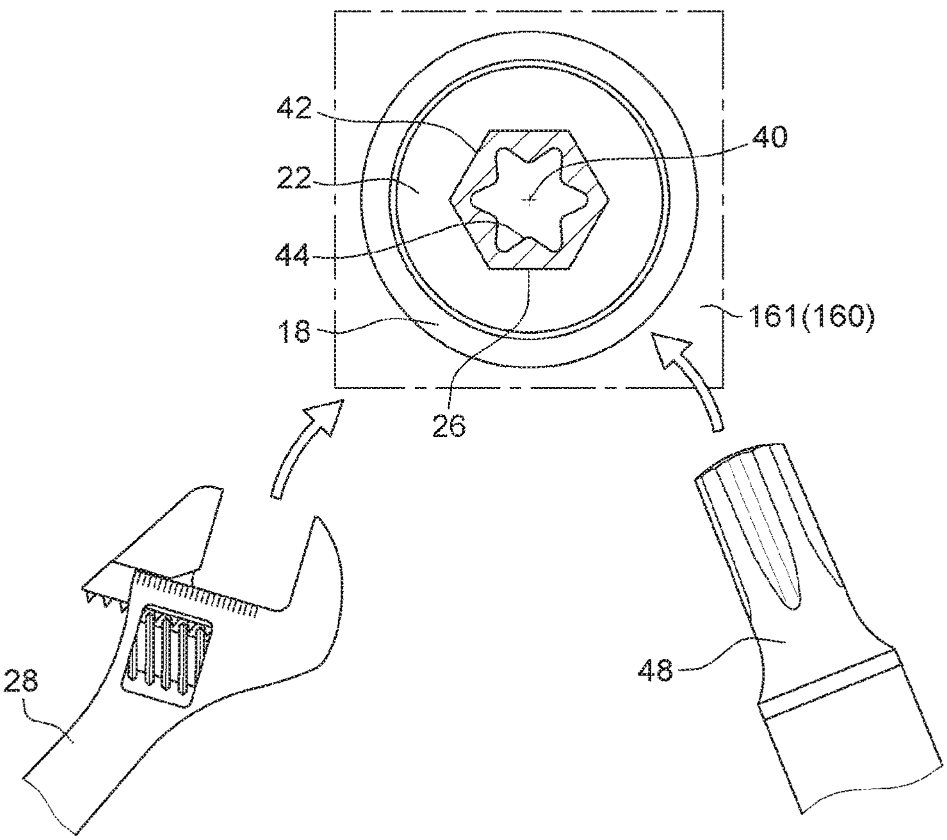
FIG. 7 is a cross-sectional view of the breakable pin according to a fourth embodiment.

FIG. 7 shows a cross-section of the breakable pin 14 in the fourth embodiment. In this embodiment, the cross-section of the breakable portion 26 has an outer surface of rotational symmetry except a circular shape, more specifically, an outer shape of a regular hexagonal polygon, as with the first embodiment. Furthermore, the breakable portion 26 defines a hollow space 40. The cross-section of the hollow space 40 has a shape of an N-point star-shaped pattern, more specifically, a 6-point star-shaped pattern as with the third embodiment.

Accordingly, if the breakable pin 14 is broken at the breakable portion 26 and the second portion 24 is separated from the first portion 22, both the regular hexagonal outer shape and the hollow space 40 with the 6-point star-shaped pattern is exposed to an outside. Accordingly, a fastening tool 48, such as a hex key, for the hollow space 40 or a fastening tool 28, such as a wrench, for the outer shape of the breakable portion 26 can be used to remove the first portion 22 from the tank 160 (the end portion 161).

It should be noted that any type of shapes can be used to the outer shape of the breakable portion 24 and the shape of the hollow space 40 as long as such a shape is rotational symmetry except a circular shape.

Other Embodiments

Figure 8:
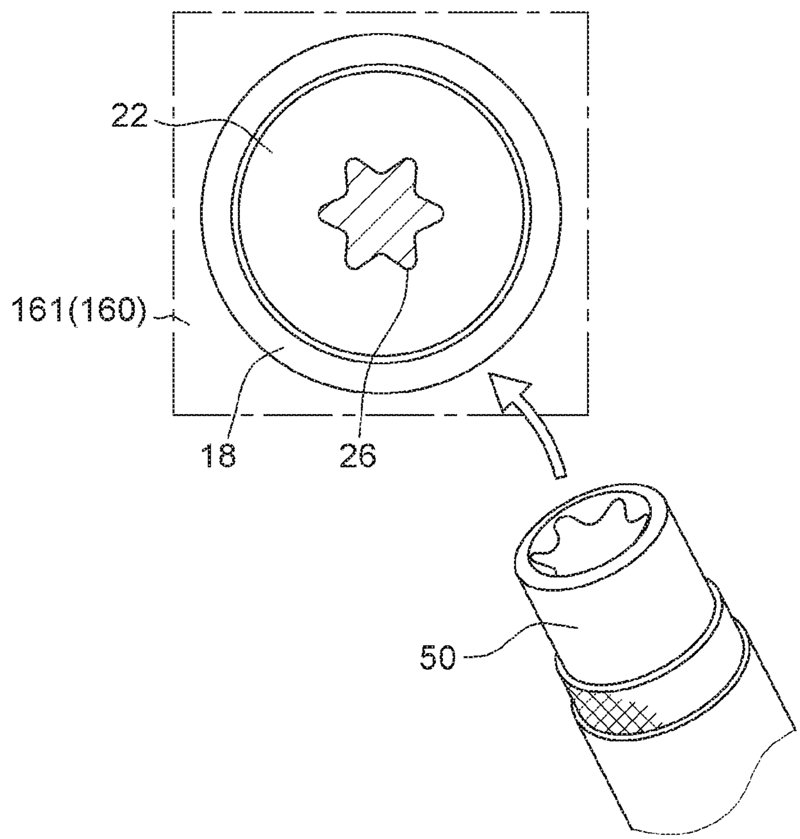
FIG. 8 is a cross-sectional view of the breakable pin according to another embodiment.

In the first and second embodiments, the breakable portion 26 has a cross-section with the regular hexagonal shape. Alternatively, as shown in FIG. 8, the breakable portion 26 may have a cross-section with a shape of an N-point star-shaped pattern as with the third embodiment. In this case, a fastening tool 50 such as a socket driver may be used to remove the breakable portion 26 from the tank 160. Similarly, the breakable portion 26 of the third embodiment may have a cross-section with a shape of regular polygon such as a regular hexagonal shape.

Furthermore, the cross-section of the breakable portion 26 may have another outer shape of rotational asymmetry except a circular shape. For example, a shape of a slot type, a double-slot type, a Phillips type, a Frearson type, a JIS B 1012 type, a Mortorq type, a Pozidriv type, a Supadriv, a Robertson type, a double-square type, a triple-square type, a double-hex type, or the like may be used.

Similarly, the cross-section of the hollow space 40 may have another shape of rotational asymmetry except a circular shape. For example, a shape of a slot type, a double-slot type, a Phillips type, a Frearson type, a JIS B 1012 type, a Mortorq type, a Pozidriv type, a Supadriv, a Robertson type, a double-square type, a triple-square type, a double-hex type, or the like may be used.

In the above-described embodiments, the radiator 100 as an in-vehicle component is fixed to the frame 10 (a vehicle body) through the holding structures 12. However, the in-vehicle component is not necessarily limited to the radiator 100. The present disclosure may be applied to any type of in-vehicle components such as a fan, a compressor, a condenser, or the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term “and/or” includes any and all combinations of one or more of the associated listed items.

What is claimed is:

1. A breakable pin for an in-vehicle component disposed on a vehicle body, the breakable pin comprising:
- a first portion inserted into the in-vehicle component along a first direction and detachably connected to the in-vehicle component;
- a second portion fixed to the vehicle body; and
- a breakable portion between the first portion and the second portion, the breakable portion having a cross-section taken along a second direction perpendicular to the first direction, wherein
- the cross-section of the breakable portion has an outer shape of rotational symmetry, and
- the outer shape of rotational symmetry is a regular polygon.

2. The breakable pin according to claim 1, wherein the cross-section of the breakable portion is coaxial with the first portion.

3. The breakable pin according to claim 1, wherein the breakable portion is narrower than the first portion and the second portion.

4. The breakable pin according to claim 1, wherein the breakable portion has a groove formed circumferentially along an outer surface of the breakable portion.

5. The breakable pin according to claim 1, wherein the first portion has a threaded outer surface engageable with a female threaded portion formed in the in-vehicle component.

6. The breakable pin according to claim 1, wherein the regular polygon is a regular hexagon.

7. A breakable pin for an in-vehicle component disposed on a vehicle body, the breakable pin comprising:
- a first portion inserted into the in-vehicle component along a first direction and detachably connected to the in-vehicle component;
- a second portion fixed to the vehicle body; and
- a breakable portion between the first portion and the second portion, the breakable portion having a cross-section taken along a second direction perpendicular to the first direction, wherein
- the cross-section of the breakable portion has an outer shape of rotational symmetry, and
- the outer shape of rotational symmetry is an N-point star-shaped pattern.

8. The breakable pin according to claim 7, wherein the N-point star-shaped pattern is a 6-point star-shaped pattern.

9. A breakable pin for an in-vehicle component disposed on a vehicle body, the breakable pin comprising:
- a first portion inserted into the in-vehicle component along a first direction and detachably connected to the in-vehicle component;
- a second portion fixed to the vehicle body; and
- a breakable portion between the first portion and the second portion, the breakable portion defining a hollow space therein and having a cross-section taken along a second direction perpendicular to the first direction, wherein
- the cross-section of the hollow space has a shape of rotational symmetry, and
- the shape of rotational symmetry is a regular polygon.

10. The breakable pin according to claim 9, wherein the cross-section of the breakable portion is coaxial with the first portion.

11. The breakable pin according to claim 9, wherein the breakable portion is narrower than the first portion and the second portion.

12. The breakable pin according to claim 9, wherein the breakable portion has a groove formed circumferentially along an outer surface of the breakable portion.

13. The breakable pin according to claim 9, wherein the first portion has a threaded outer surface engageable with a female threaded portion formed in the in-vehicle component.

14. The breakable pin according to claim 9, wherein the regular polygon is a regular hexagon.

15. A breakable pin for an in-vehicle component disposed on a vehicle body, the breakable pin comprising:
- a first portion inserted into the in-vehicle component along a first direction and detachably connected to the in-vehicle component;
- a second portion fixed to the vehicle body; and
- a breakable portion between the first portion and the second portion, the breakable portion defining a hollow space therein and having a cross-section taken along a second direction perpendicular to the first direction, wherein
- the cross-section of the hollow space has a shape of rotational symmetry, and
- the shape of rotational symmetry is an N-point star-shaped pattern.

16. The breakable pin according to claim 15, wherein the N-point star-shaped pattern is a 6-point star-shaped pattern.

17. The breakable pin according to claim 1, wherein
- the breakable portion defines a hollow space therein,
- the cross-section of the hollow space has a shape of rotational symmetry, and
- the shape of rotational symmetry is a regular polygon.

18. The breakable pin according to claim 9, wherein
- the cross-section of the breakable portion has an outer shape of rotational symmetry, and
- the outer shape of rotational symmetry is a regular polygon.

19. The breakable pin according to claim 1, wherein
- the breakable portion defines a hollow space therein,
- the cross-section of the hollow space has a shape of rotational symmetry, and
- the shape of rotational symmetry is a regular polygon or an N-point star-shaped pattern.

20. The breakable pin according to claim 7, wherein
- the breakable portion defines a hollow space therein,
- the cross-section of the hollow space has a shape of rotational symmetry, and
- the shape of rotational symmetry is a regular polygon or an N-point star-shaped pattern.

21. The breakable pin according to claim 9, wherein
- the cross-section of the breakable portion has an outer shape of rotational symmetry, and
- the outer shape of rotational symmetry is a regular polygon or an N-point star-shaped pattern.

22. The breakable pin according to claim 15, wherein
- the cross-section of the breakable portion has an outer shape of rotational symmetry, and the outer shape of rotational symmetry is a regular polygon or an N-point star-shaped pattern.

* * * * *